(12) United States Patent
Wen et al.

(10) Patent No.: US 9,778,998 B2
(45) Date of Patent: Oct. 3, 2017

(54) DATA RESTORATION METHOD AND SYSTEM

(71) Applicant: Huawei Technologies Co., Ltd., Shenzhen (CN)

(72) Inventors: Jijun Wen, Beijing (CN); Yuanyuan Nie, Beijing (CN); Wentao Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/660,460

(22) Filed: Mar. 17, 2015

(65) Prior Publication Data

US 2015/0261626 A1    Sep. 17, 2015

(30) Foreign Application Priority Data

Mar. 17, 2014    (CN) .......................... 2014 1 0099107

(51) Int. Cl.
*G06F 11/14*    (2006.01)
*G06F 17/30*    (2006.01)

(52) U.S. Cl.
CPC .... *G06F 11/1469* (2013.01); *G06F 17/30575* (2013.01)

(58) Field of Classification Search
USPC .......................................................... 714/16
See application file for complete search history.

(56) References Cited

U.S. PATENT DOCUMENTS

| 5,535,381 | A | * | 7/1996 | Kopper | .................. G06F 3/0601 |
| | | | | | 710/52 |
| 5,715,447 | A | * | 2/1998 | Hayashi | .................... G06F 9/52 |
| 5,793,944 | A | * | 8/1998 | Luick | .................. G06F 9/30116 |
| | | | | | 712/244 |
| 2004/0193945 | A1 | * | 9/2004 | Eguchi | .................. G06F 11/142 |
| | | | | | 714/6.1 |

(Continued)

FOREIGN PATENT DOCUMENTS

| CN | 101034364 A | 9/2007 |
| CN | 102156720 A | 8/2011 |

(Continued)

OTHER PUBLICATIONS

1st Office Action in corresponding Chinese Patent Application No. 201410099107 (Aug. 16, 2016).

*Primary Examiner* — Kamini Patel
(74) *Attorney, Agent, or Firm* — Leydig, Voit & Mayer, Ltd.

(57) ABSTRACT

Embodiments of the present invention disclose a data restoration method, including: after a transaction is submitted, saving a generated transaction log to a buffer of a current node, and backing up the transaction log to a buffer of at least one backup node except the current node; writing the transaction log saved in the buffer of the current node or the transaction log backed up in the buffer of the backup node into a transaction log file in a disk, where the transaction log file in the disk is used for restoring data of the current node; and restoring, based on the transaction log file in the disk, lost data of the current node when a data loss event occurs in the current node. By means of the present invention, a risk of system data can be reduced, and durability, safety, and reliability of the system data can be improved.

14 Claims, 6 Drawing Sheets

(56) References Cited

U.S. PATENT DOCUMENTS

| | | | |
|---|---|---|---|
| 2005/0071391 A1* | 3/2005 | Fuerderer | G06F 17/30 |
| 2005/0240677 A1* | 10/2005 | Liu | H04L 41/0654 |
| | | | 709/231 |
| 2005/0243722 A1* | 11/2005 | Liu | H04L 12/1868 |
| | | | 370/235 |
| 2006/0150010 A1* | 7/2006 | Stiffler | G06F 11/1438 |
| | | | 714/13 |
| 2007/0189153 A1 | 8/2007 | Mason | |
| 2011/0184915 A1* | 7/2011 | Wu | G06F 17/30584 |
| | | | 707/674 |
| 2012/0117028 A1* | 5/2012 | Gold | G06F 11/1451 |
| | | | 707/640 |
| 2013/0036093 A1 | 2/2013 | Heiser et al. | |
| 2013/0151895 A1* | 6/2013 | Lee | G06F 11/1658 |
| | | | 714/19 |
| 2014/0195564 A1* | 7/2014 | Talagala | G06F 12/0804 |
| | | | 707/802 |
| 2014/0215134 A1* | 7/2014 | Tsai | G06F 12/0246 |
| | | | 711/103 |
| 2014/0281670 A1* | 9/2014 | Vasseur | G06F 11/2002 |
| | | | 714/4.11 |
| 2016/0048450 A1* | 2/2016 | Ostrowski | G06F 3/0611 |
| | | | 714/6.3 |
| 2016/0085637 A1* | 3/2016 | Vlachogiannis | G06F 11/1469 |
| | | | 714/15 |

FOREIGN PATENT DOCUMENTS

| | | |
|---|---|---|
| CN | 103198159 A | 7/2013 |
| WO | WO 2007098380 A2 | 8/2007 |

* cited by examiner

DATA RESTORATION METHOD AND SYSTEM

CROSS-REFERENCE TO RELATED APPLICATION

This application claims priority to Chinese Patent Application No. 201410099107.6, filed on Mar. 17, 2014, which is hereby incorporated by reference in its entirety.

TECHNICAL FIELD

The present invention relates to the communications field, and in particular, to a data restoration method and system.

BACKGROUND

To durably save, in a database, a modification made by a transaction to data in a database system, and avoid a rollback operation, a transaction log generated in a transaction processing process is usually written to a reliable disk medium. When a data loss occurs in the database system, the transaction log in a disk provides a basis for a data restoration operation in the database system, so as to achieve durability of the database system.

A transaction log is usually saved by using a synchronous submission solution, that is, when a transaction is submitted, a last recording location corresponding to a generated transaction log is selected, and after all transaction logs before the location are written into a disk, submission of the transaction is ended.

Because in the foregoing solution, disk write JO operations are generated in a database system, in a case of a large concurrent amount of transactions, a concurrent conflict of the database system is caused. The prior art provides an asynchronous submission solution for a transaction log, where a transaction submission operation may be prior to an operation of writing a transaction log into a disk, so as to reduce a concurrent conflict event of the database system. The prior art has at least the following problems: In a scenario in which an existing technical solution is applied to a cluster database, after a node in the cluster database performs transaction submission, if a data crash event occurs in the node when a transaction log has not been completely written into a disk, a database system cannot perform a data restoration operation according to the transaction log, which causes a situation of a permanent data loss. Therefore, it can be known that the asynchronous submission solution for a transaction log affects data durability of a database system, causes a data loss risk to the database system, reduces safety of the database system, and makes the database system unreliable.

SUMMARY

Embodiments of the present invention provide a data restoration method and system, which are used to solve a problem in the prior art that in an asynchronous submission solution for a transaction log, durability and safety of data in a database system are poor, and the database system is unreliable.

To solve the foregoing technical problem, according to a first aspect, an embodiment of the present invention provides a data restoration method, where the method includes:

after a transaction is submitted, saving a generated transaction log to a buffer of a current node, and backing up the transaction log to a buffer of at least one backup node except the current node;

writing the transaction log saved in the buffer of the current node or the transaction log backed up in the buffer of the backup node into a transaction log file in a disk, where the transaction log file in the disk is used for restoring data of the current node; and restoring, based on the transaction log file in the disk, lost data of the current node when a data loss event occurs in the current node.

With reference to the first aspect, in a first possible implementation manner, before the after a transaction is submitted, saving a generated transaction log to a buffer of a current node, and backing up the transaction log to a buffer of at least one backup node except the current node, the method further includes:

setting a safety level of the current node and a backup node quantity corresponding to the safety level; and selecting, for the current node from a node except the current node, a node of the backup node quantity corresponding to the safety level as a backup node, and using a buffer of the selected backup node as a buffer for backing up the transaction log.

With reference to the first possible implementation manner of the first aspect, in a second possible implementation manner, the selecting, for the current node from a node except the current node, a node of the backup node quantity corresponding to the safety level as a backup node includes:

selecting the backup node from a node, except the current node, adjacent to the current node, where a quantity of the selected backup nodes is equal to the backup node quantity corresponding to the safety level;

or selecting the backup node from a node, except the current node, including a vacant buffer, where a quantity of the selected backup nodes is equal to the backup node quantity corresponding to the safety level.

With reference to the first aspect, the first possible implementation manner of the first aspect, or the second possible implementation manner of the first aspect, in a third possible implementation manner, the writing the transaction log saved in the buffer of the current node or the transaction log backed up in the buffer of the backup node into a transaction log file in a disk includes:

determining, by the current node, whether the transaction log file in the disk includes the transaction log saved in the buffer of the current node;

if it is determined that the transaction log file in the disk does not include the transaction log saved in the buffer of the current node, writing, by the current node, the transaction log saved in the buffer of the current node into the transaction log file in the disk; and if it is determined that the transaction log file in the disk includes the transaction log saved in the buffer of the current node, skipping writing, by the current node, the transaction log saved in the buffer of the current node into the transaction log file in the disk.

With reference to the first aspect, the first possible implementation manner of the first aspect, the second possible implementation manner of the first aspect, or the third possible implementation manner of the first aspect, in a fourth possible implementation manner, the writing the transaction log saved in the buffer of the current node or the transaction log backed up in the buffer of the backup node into a transaction log file in a disk includes:

determining, by the backup node, whether the transaction log file in the disk includes the transaction log backed up in the buffer of the backup node;

if it is determined that the transaction log file in the disk does not include the transaction log backed up in the buffer of the backup node, writing, by the backup node, the transaction log backed up in the buffer of the backup node into the transaction log file in the disk; and if it is determined that the transaction log file in the disk includes the transaction log backed up in the buffer of the backup node, skipping writing, by the backup node, the transaction log backed up in the buffer of the backup node into the transaction log file in the disk.

With reference to the first aspect, the first possible implementation manner of the first aspect, or the second possible implementation manner of the first aspect, in a fifth possible implementation manner, the disk includes a current node disk supporting only access by the current node, and a backup node disk supporting only access by the backup node; and the writing the transaction log saved in the buffer of the current node or the transaction log backed up in the buffer of the backup node into a transaction log file in a disk includes:

writing, by the current node, the transaction log saved in the buffer of the current node into a transaction log file in the current node disk, where the transaction log file in the current node disk is used for restoring the data of the current node;

and writing, by the backup node, the transaction log backed up in the buffer of the backup node into a transaction log file in the backup node disk, where the transaction log file in the backup node disk is used for restoring the data of the current node.

With reference to the fifth possible implementation manner of the first aspect, in a sixth possible implementation manner, the restoring, based on the transaction log file in the disk, lost data of the current node when a data loss event occurs in the current node includes:

reading the transaction log file in the current node disk;
reading the transaction log file in the backup node disk;
selecting, from the read transaction log files, a transaction log file having most complete information; and
restoring the lost data of the current node by using the transaction log file having the most complete information.

Correspondingly, according to a second aspect, an embodiment of the present invention further provides a data restoration system, including:

a saving and backup module, configured to: after a transaction is submitted, save a generated transaction log to a buffer of a current node, and back up the transaction log to a buffer of at least one backup node except the current node;

a writing module, configured to write the transaction log saved in the buffer of the current node or the transaction log backed up in the buffer of the backup node into a transaction log file in a disk, where the transaction log file in the disk is used for restoring data of the current node; and a restoration module, configured to restore, based on the transaction log file in the disk, lost data of the current node when a data loss event occurs in the current node.

With reference to the second aspect, in a first possible implementation manner, the data restoration system further includes:

a setting module, configured to set a safety level of the current node and a backup node quantity corresponding to the safety level; and a selecting module, configured to select, for the current node from a node except the current node, a node of the backup node quantity corresponding to the safety level as a backup node, and use a buffer of the selected backup node as a buffer for backing up the transaction log.

With reference to the first possible implementation manner of the second aspect, in a second possible implementation manner, the selecting module is further configured to select the backup node from a node, except the current node, adjacent to the current node, where a quantity of the selected backup nodes is equal to the backup node quantity corresponding to the safety level;

or is further configured to select the backup node from a node, except the current node, including a vacant buffer, where a quantity of the selected backup nodes is equal to the backup node quantity corresponding to the safety level.

With reference to the second aspect, the first possible implementation manner of the second aspect, or the second possible implementation manner of the second aspect, in a third possible implementation manner, the writing module includes:

a first determining unit, configured to: determine whether the transaction log file in the disk includes the transaction log saved in the buffer of the current node; if it is determined that the transaction log file in the disk does not include the transaction log saved in the buffer of the current node, generate a first writing message and send the first writing message to a first writing unit; and if it is determined that the transaction log file in the disk includes the transaction log saved in the buffer of the current node, generate a first writing skipping message and send the first writing skipping message to the first writing unit; and the first writing unit, configured to: after receiving the first writing message, write the transaction log saved in the buffer of the current node into the transaction log file in the disk; and after receiving the first writing skipping message, skip writing the transaction log saved in the buffer of the current node into the transaction log file in the disk.

With reference to the second aspect, the first possible implementation manner of the second aspect, the second possible implementation manner of the second aspect, or the third possible implementation manner of the second aspect, in a fourth possible implementation manner, the writing module further includes:

a second determining unit, configured to: determine whether the transaction log file in the disk includes the transaction log backed up in the buffer of the backup node; if it is determined that the transaction log file in the disk does not include the transaction log backed up in the buffer of the backup node, generate a second writing message and send the second writing message to a second writing unit; and if it is determined that the transaction log file in the disk includes the transaction log backed up in the buffer of the backup node, generate a second writing skipping message and send the second writing skipping message to the second writing unit; and the second writing unit, configured to: after receiving the second writing message, write the transaction log backed up in the buffer of the backup node into the transaction log file in the disk; and after receiving the second writing skipping message, skip writing the transaction log backed up in the buffer of the backup node into the transaction log file in the disk.

With reference to the second aspect, the first possible implementation manner of the second aspect, or the second possible implementation manner of the second aspect, in a fifth possible implementation manner, the disk includes a current node disk supporting only access by the current node, and a backup node disk supporting only access by the backup node; and the writing module includes:

a current node writing unit, configured to write the transaction log saved in the buffer of the current node into a transaction log file in the current node disk, where the transaction log file in the current node disk is used for restoring the data of the current node;

and a backup node writing unit, configured to write the transaction log backed up in the buffer of the backup node into a transaction log file in the backup node disk, where the transaction log file in the backup node disk is used for restoring the data of the current node.

With reference to the fifth possible implementation manner of the second aspect, in a sixth possible implementation manner, the restoration module includes:

a reading unit, configured to read the transaction log file in the current node disk and further configured to read the transaction log file in the backup node disk;

a selecting unit, configured to select, from the transaction log files read by the reading module, a transaction log file having most complete information; and a restoration unit, configured to restore the lost data of the current node by using the transaction log file having the most complete information.

According to the embodiments of the present invention, after a transaction is submitted, a generated transaction log is not only saved in a buffer of a current node, but also backed up to a buffer of another node, which can reduce a probability of a transaction log loss caused by a data crash event of a node, reliably write a transaction log into a disk, and provide a reliable transaction log file for a data restoration operation of the node, thereby reducing a risk of system data, and improving durability, safety, and reliability of the system data.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
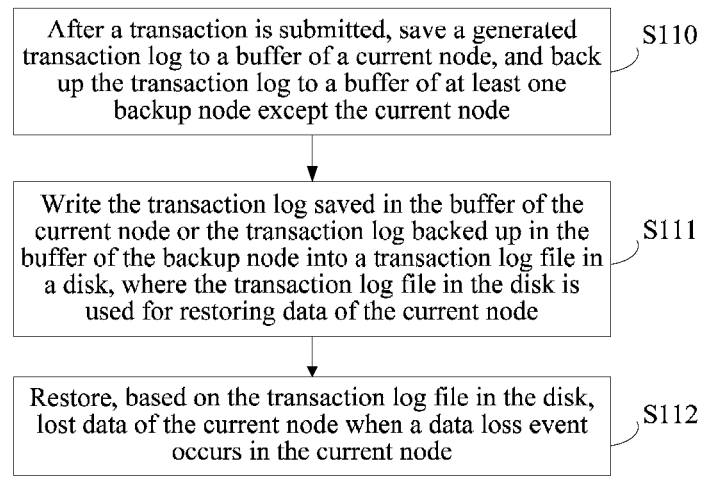
FIG. 1 is a flowchart of a data restoration method according to a first embodiment of the present invention.

FIG. 1 is a flowchart of a data restoration method according to a first embodiment of the present invention. The method is applicable to restoration work of restoring, in a database system, data of a node by using a transaction log of the node. A cluster database includes at least two data processing nodes, generally, a buffer of the database backs up a transaction log generated in a process in which each data processing node processes data, and when a situation in which data of a node is lost occurs, the data of the node may be restored by using a transaction log that is in the buffer and corresponds to the node. In this embodiment of the present invention, operations of backing up a transaction log after a data processing process of a node ends, and restoring lost data of the node when a data loss event occurs in the node may be performed by using the method shown in FIG. 1. As shown in FIG. 1, a processing procedure of this embodiment may include the following steps:

Step S110: After a transaction is submitted, save a generated transaction log to a buffer of a current node, and back up the transaction log to a buffer of at least one backup node except the current node, where the transaction log saved in the buffer of the current node is written into a transaction log file that is in a disk and used to restore data of the current node, so that a recording location of the transaction log file in the disk is kept the same as a recording location of the transaction log; and the generated transaction log is saved to the buffer of the current node, and the transaction log is backed up to a buffer of another node, which can improve safety of the transaction log of the current node.

Further optionally, before this step, this method further provides an implementable solution to a manner of selecting a backup node and using a buffer of the selected backup node as a buffer for backing up the transaction log:

First, a safety level of the current node and a backup node quantity corresponding to the safety level are set. It may be considered that a higher safety level of a node indicates a greater quantity of backup nodes needed by the node, a WAL safety factor (WSF, WAL Safety Factor) is greater than or equal to 1, and when WSF>1, at least one node should be specified in advance in a cluster database system as a backup node of the current node. The backup node quantity may increase in direct proportion to the safety level. For example, it may be set that when a WSF of the current node is equal to 3, two backup nodes of the current node should exist in the cluster database system, and when the WSF of the current node is equal to 4, three backup nodes of the current node should exist in the cluster database system.

Next, a node of the backup node quantity corresponding to the safety level is selected for the current node from a node except the current node as a backup node, and a buffer of the selected backup node is used as a buffer for backing up the transaction log.

Further optionally, a principle for selecting a backup node may be a proximity principle, that is, a backup node of the quantity corresponding to the safety level is selected from a node adjacent to the current node. The selection may also be performed according to a rule, for example, a backup node of the quantity corresponding to the safety level is selected from a node, except the current node, including a vacant buffer. It can be seen from FIG. 10 that in a cluster database system, which has a Shared-disk architecture, shown in FIG. 10, each node includes multiple buffers that can be used to save a transaction log; and when it is set that a safety level WSF of a node 2 is equal to 3, two backup nodes except the node 2 which is used as the current node should exist in the system; and a node 1 and a node 3 that are adjacent to the current node may be selected as backup nodes.

Further optionally, after the backup node is determined, the buffer of the backup node is used as a buffer for saving the transaction log of the current node. Specifically, an address of the buffer may be registered; and after the registration succeeds, registration information is sent to the backup node corresponding to the buffer, so that the transaction log of the current node is accurately written into the buffer. In the foregoing example, a vacant buffer may be selected from the node 1 in the system shown in FIG. 10, an address of the buffer is recorded and is registered as a buffer for saving the transaction log of the current node, after the registration succeeds, registration information may be sent to the node 1, and the node 1 writes, according to the registration information sent by the current node, the transaction log of the current node into the buffer corresponding to the registration information; and a vacant buffer is selected from the node 3 in the system shown in FIG. 10, an address of the buffer is recorded and is registered as a buffer for saving the transaction log of the current node, after the registration succeeds, registration information may be sent to the node 3, and the node 3 writes, according to the registration information sent by the current node, the transaction log of the current node into the buffer corresponding to the registration information.

Step S111: Write the transaction log saved in the buffer of the current node or the transaction log backed up in the buffer of the backup node into a transaction log file in a disk, where the transaction log file in the disk is used for restoring data of the current node.

Figure 10:
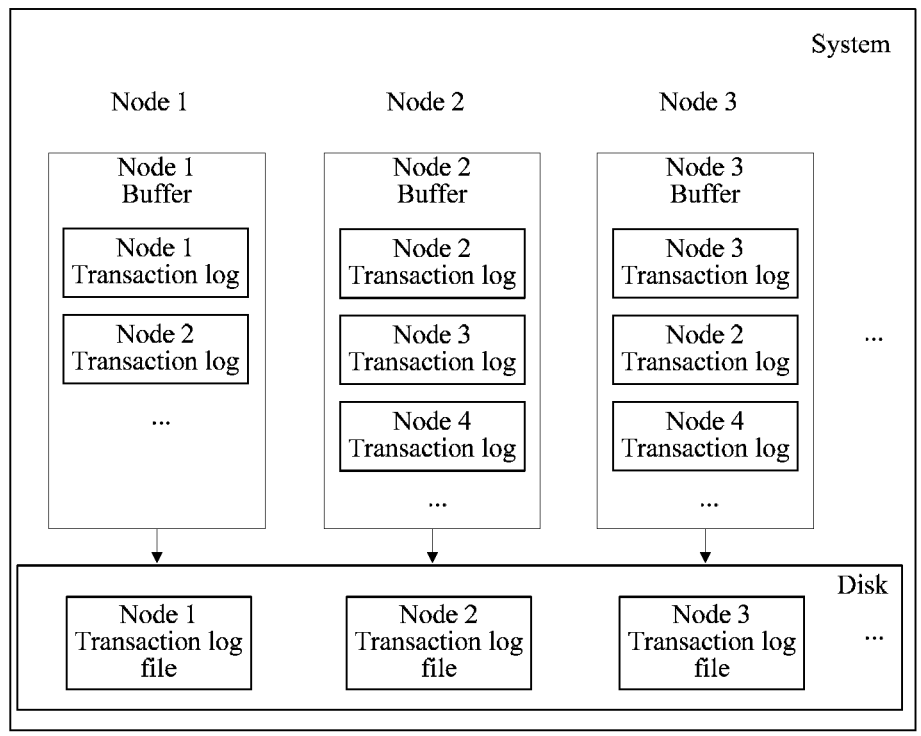
FIG. 10 is a schematic composition diagram of a structure of a system according to an embodiment of the present invention.

In the cluster database system, which has a Shared-disk architecture, shown in FIG. 10, in a case in which all files in the disk can be accessed by using a node, there may be only one transaction log file that is in the disk and corresponds to the current node, and a writing operation of the transaction log file is performed by each node based on a transaction log saved in a buffer of each node. As described above, when the safety level of the current node is greater than 1, a backup node that can write the transaction log of the current node into the transaction log file, in the disk, of the current node exists in the system. For example, when the node 2 shown in FIG. 10 is used as the current node, backup nodes that can perform a writing operation include the node 1, the node 2, and the node 3.

Further optionally, in this step, a trigger condition of the operation of writing, by the current node or the backup node, the transaction log saved in the buffer of the current node or the backup node into the transaction log file in the disk may be periodical trigger, which may include trigger performed when a buffer storing the transaction log is full, and may further include trigger performed at a time interval starting from specified time.

When a writing operation of the current node is triggered, the current node first determines whether the transaction log file, in the disk, of the current node includes the transaction log saved in the buffer of the current node, that is, whether a location of the transaction log file, in the disk, of the current node is the same as a location of the transaction log in the buffer of the current node; and when the location of the transaction log file, in the disk, of the current node is the same as the location of the transaction log in the buffer of the current node, it indicates that the transaction log file, in the disk, of the current node includes the transaction log saved in the buffer of the current node, and the current node does not need to perform the writing operation again. When the current node determines that the transaction log file, in the disk, of the current node does not include the transaction log saved in the buffer of the current node, the current node writes the transaction log saved in the buffer of the current node into the transaction log file in the disk; and when the current node determines that the transaction log file, in the disk, of the current node includes the transaction log saved in the buffer of the current node, the current node skips writing the transaction log saved in the buffer of the current node into the transaction log file in the disk. For example, in FIG. 10, when a transaction log writing operation of the current node (the node 2) is triggered, the current node first determines whether the transaction log file, in the disk, of the current node (the node 2) includes the transaction log saved in the buffer of the current node (the node 2); and if the transaction log file, in the disk, of the current node (the node 2) does not include the transaction log saved in the buffer of the current node (the node 2), the current node (the node 2) writes the transaction log saved in the buffer of the current node (the node 2) into the transaction log file, in the disk, of the current node (the node 2), and if the transaction log file, in the disk, of the current node (the node 2) includes the transaction log saved in the buffer of the current node (the node 2), the current node (the node 2) skips writing the transaction log saved in the buffer of the current node (the node 2) into the transaction log file, in the disk, of the current node (the node 2).

When a writing operation of the backup node is triggered, the backup node first determines whether the transaction log file, in the disk, of the current node includes the transaction log backed up in the buffer of the backup node, that is, whether a location of the transaction log file, in the disk, of the current node is the same as a location of the transaction log in the buffer of the backup node; and when the location of the transaction log file, in the disk, of the current node is the same as the location of the transaction log in the buffer of the backup node, it indicates that the transaction log file, in the disk, of the current node includes the transaction log backed up in the buffer of the backup node, and the backup node does not need to perform the writing operation again. When the backup node determines that the transaction log file, in the disk, of the current node does not include the transaction log backed up in the buffer of the backup node, the backup node writes the transaction log backed up in the buffer of the backup node into the transaction log file in the disk; and when the backup node determines that the transaction log file, in the disk, of the current node includes the transaction log backed up in the buffer of the backup node, the backup node skips writing the transaction log backed up in the buffer of the backup node into the transaction log file in the disk. For example, in FIG. 10, when the backup node (the node 1 or the node 3) of the current node performs a writing operation, the backup node (the node 1 or the node 3) first determines whether the transaction log file, in the disk, of the current node (the node 2) includes the transaction log backed up in the buffer (a buffer that is in the node 1 and used for the transaction log of the current node, or a buffer that is in the node 3 and used for the transaction log of the current node) of the backup node; and if the transaction log file, in the disk, of the current node (the node 2) does not include the transaction log backed up in the buffer of the backup node, the backup node (the node 1 or the node 3) writes the transaction log backed up in the buffer of the backup node into the transaction log file, in the disk, of the current node (the node 2), and if the transaction log file, in the disk, of the current node (the node 2) includes the transaction log backed up in the buffer of the backup node, the backup node (the node 1 or the node 3) skips writing the transaction log backed up in the buffer of the backup node into the transaction log file, in the disk, of the current node.

Step S112: Restore, based on the transaction log file in the disk, lost data of the current node when a data loss event occurs in the current node.

It can be known from the foregoing method that after a transaction of a current node is submitted, a generated transaction log is not only saved in a buffer of the current node, but also is backed up to a buffer of another node, which can reduce a probability of a transaction log loss caused by a data crash event of a node, and improve safety of a transaction log. The current node and all backup nodes that save the transaction log of the current node all can perform an operation of writing the transaction log, which is saved in buffers of the current node and all the backup nodes, of the current node into a transaction log file in a disk, so that a recording location of the transaction log file in the disk is always kept as a recording location of a log generated in a last transaction operation of the current node. If a breakdown occurs in a database system, after the system is started and restored, the current node can read, from the disk, a transaction log file corresponding to the current node, and restore lost data of the current node.

This method is applied to a cluster database system in a high-speed interconnection network, and in the cluster database system, a node mentioned in the embodiment of this solution may be an interconnection device having data transmission and sharing functions, such as a node switch (Infiniband, a high-speed interconnection device) or a router.

The foregoing embodiment can better support a cluster database system having a Shared-Disk architecture. Because in this method, a safety factor and multiple buffers, for saving a transaction log, of backup nodes are set for a node in a cluster, durability of a transaction log is improved. Both a current node and a backup node can write a transaction log, which is saved in buffers of the current node and the backup node, of the current node into a transaction log file that is in a disk and corresponds to the current node, which can improve reliability of the transaction log file. This embodiment of the present invention keeps concurrent processing performance of an asynchronous submission solution in the prior art, and at the same time has durability of a synchronous submission solution; therefore, a risk of system data is reduced, and safety and reliability of the system data are improved.

Figure 2:
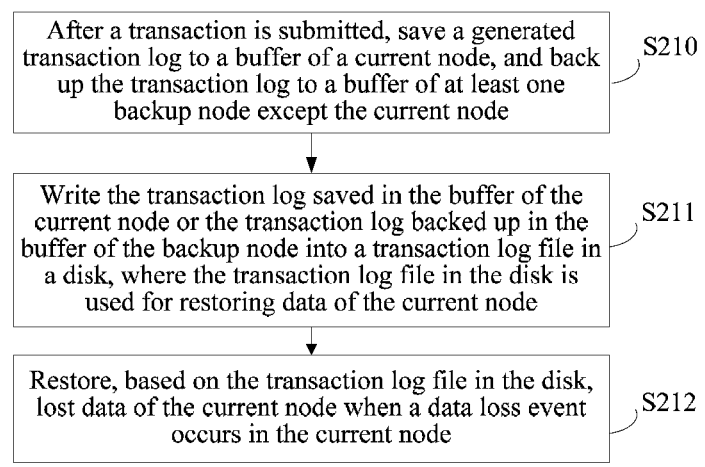
FIG. 2 is a flowchart of a data restoration method according to a second embodiment of the present invention.

FIG. 2 is a flowchart of a data restoration method according to a second embodiment of the present invention. The method is applicable to restoration work of restoring, in a database system, data of a node by using a transaction log of the node. A cluster database includes at least two data processing nodes, generally, a buffer of the database backs up a transaction log generated in a process in which each data processing node processes data, and when a situation in which data of a node is lost occurs, the data of the node may be restored by using a transaction log that is in the buffer and corresponds to the node. In this embodiment of the present invention, operations of backing up a transaction log after a data processing process of a node ends, and restoring lost data of the node when a data loss event occurs in the node may be performed by using the method shown in FIG. 2. As shown in FIG. 2, a processing procedure of this embodiment may include the following steps:

Step S210: After a transaction is submitted, save a generated transaction log to a buffer of a current node, and back up the transaction log to a buffer of at least one backup node except the current node, where the transaction log saved in the buffer of the current node is written into a transaction log file that is in a disk and used to restore data of the current node, so that a recording location of the transaction log file in the disk is kept the same as a recording location of the transaction log; and the generated transaction log is saved to the buffer of the current node, and the transaction log is backed up to a buffer of another node, which can improve safety of the transaction log of the current node.

Further optionally, before this step, this method further provides an implementable solution to a manner of selecting a backup node and using a buffer of the selected backup node as a buffer for backing up the transaction log:

First, a safety level of the current node and a backup node quantity corresponding to the safety level are set. It may be considered that a higher safety level of a node indicates a greater quantity of backup nodes needed by the node, a WAL safety factor (WSF, WAL Safety Factor) is greater than or equal to 1, and when WSF>1, at least one node should be specified in advance in a cluster database system as a backup node of the current node. The backup node quantity may increase in direct proportion to the safety level. For example, it may be set that when a WSF of the current node is equal to 3, two backup nodes of the current node should exist in the cluster database system, and when the WSF of the current node is equal to 4, three backup nodes of the current node should exist in the cluster database system.

Next, a node of the backup node quantity corresponding to the safety level is selected for the current node from a node except the current node as a backup node, and a buffer of the selected backup node is used as a buffer for backing up the transaction log.

Further optionally, a principle for selecting a backup node may be a proximity principle, that is, a backup node of the quantity corresponding to the safety level is selected from a node adjacent to the current node. The selection may also be performed according to a rule, for example, a backup node of the quantity corresponding to the safety level is selected from a node, except the current node, including a vacant buffer. It can be seen from FIG. 11 that in a cluster database system, which has a Shared-Nothing architecture, shown in FIG. 11, each node includes multiple buffers that can be used to save a transaction log; and when it is set that a safety level WSF of a node 2 is equal to 3, two backup nodes except the node 2 which is used as the current node should exist in the system, and a node 1 and a node 3 that are adjacent to the current node may be selected as backup nodes.

Further optionally, after the backup node is determined, the buffer of the backup node is used as a buffer for saving the transaction log of the current node. Specifically, an address of the buffer may be registered; and after the registration succeeds, registration information is sent to the backup node corresponding to the buffer, so that the transaction log of the current node is accurately written into the buffer. In the foregoing example, a vacant buffer may be selected from the node 1 in the system shown in FIG. 11, an address of the buffer is recorded and is registered as a buffer for saving the transaction log of the current node, after the registration succeeds, registration information may be sent to the node 1, and the node 1 writes, according to the registration information sent by the current node, the transaction log of the current node into the buffer corresponding to the registration information; and a vacant buffer is selected from the node 3 in the system shown in FIG. 11, an address of the buffer is recorded and is registered as a buffer for saving the transaction log of the current node, after the registration succeeds, registration information may be sent to the node 3, and the node 3 writes, according to the registration information sent by the current node, the transaction log of the current node into the buffer corresponding to the registration information.

Step S211: Write the transaction log saved in the buffer of the current node or the transaction log backed up in the buffer of the backup node into a transaction log file in a disk, where the transaction log file in the disk is used for restoring data of the current node.

Figure 11:
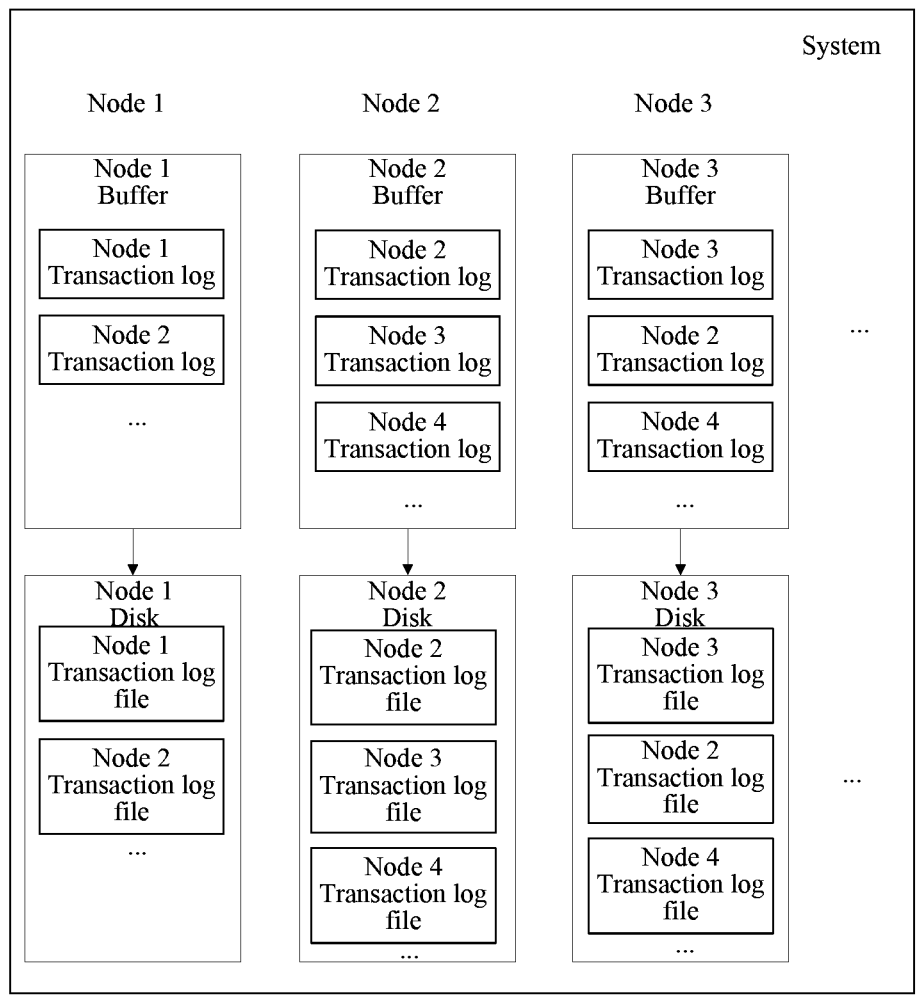
FIG. 11 is a schematic composition diagram of a structure of another system according to an embodiment of the present invention.

In the cluster database system, which has a Shared-Nothing architecture, shown in FIG. 11, a corresponding disk is configured for each node, and disk data is not shared between nodes. Therefore, when a transaction log of a current node and a transaction log of another node are saved in a buffer of the current node, a disk configured for the node includes a transaction log file of the node, and further includes a transaction log file that is of the another node and saved in the buffer of the node when the node is used as a backup node; and a writing operation is performed for the transaction log files by the node according to the transaction logs saved in the buffer of the node. As described above, when the safety level of the current node is greater than 1, a backup node for saving the transaction log of the current node exists in the system; and then correspondingly, there may be multiple transaction log files that can be used for restoring the data of the current node, and the transaction log files exist in disks configured for the current node and the backup node. For example, when the node 2 shown in FIG. 11 is used as the current node, configured disks corresponding to the node 1, the node 2, and the node 3 all include the transaction log file of the current node, the node 1 may perform a writing operation on the transaction log, in a buffer of the node 1, of the current node according to the transaction log file, in the disk configured for the node 1, of the current node, the node 2 may perform a writing operation on the transaction log, in a buffer of the node 2, of the current node according to the transaction log file, in the disk configured for the node 2, of the current node, and the node 3 may perform a writing operation on the transaction log, in a buffer of the node 3, of the current node according to the transaction log file, in the disk configured for the node 3, of the current node.

Further optionally, in this step, a trigger condition of the operation of writing, by the current node or the backup node, the transaction log saved in the buffer of the current node or the backup node into the transaction log file in the disk may be trigger, which may include trigger performed when a buffer storing the transaction log is full, and may further include trigger performed at a time interval starting from specified time.

When a writing operation of the current node is triggered, the current node writes the transaction log, which is saved in the buffer of the current node, of the current node into a transaction log file that is in a disk configured for the current node (that is, a current node disk) and used for restoring the data of the current node, where the current node disk mentioned herein is a disk or a disk array that does not support access by a node except the current node. Because the transaction log file in the current node disk cannot be read by another node, in a case in which a data loss does not occur in the current node, a location of the transaction log file does not need to be detected in this step, and the writing operation may be directly performed. For example, in a schematic diagram of the system shown in FIG. 11, when the writing operation of the current node (the node 2) is triggered, the current node (the node 2) may write the transaction log saved in the buffer of the current node into a transaction log file, in the current node disk, of the node 2. In addition, in the system, the current node can also be simultaneously used as a backup node to save a transaction log of another node to the buffer of the current node; therefore, the current node may also write the transaction log that is of the another node and saved in the buffer of the current node into a transaction log file that is in the current node disk and corresponds to the another node. For example, in the schematic diagram of the system shown in FIG. 11, the current node (the node 2) may write a transaction log that is of the node 1 and saved in the buffer of the current node into a transaction log file, in the current node disk, of the node 1, and the current node (the node 2) may write a transaction log that is of the node 3 and saved in the buffer of the current node into a transaction log file, in the current node disk, of the node 3.

When a writing operation of the backup node is triggered, the backup node writes the transaction log saved in the buffer of the backup node into a transaction log file that is in a disk configured for the backup node (that is, a backup node disk) and used for restoring the data of the current node, where the backup node disk is a disk or a disk array that does not support access by a node except the backup node. Because the transaction log file, in the backup node disk, of the current node cannot be read by another node (can neither be read by the current node), in a case in which a data loss does not occur in the backup node, a location of the transaction log file does not need to be detected in this step, and the backup node may directly perform the writing operation. For example, in the schematic diagram of the system shown in FIG. 11, when the writing operation of the backup node (the node 1) is triggered, the backup node (the node 1) may write the transaction log that is of the current node (the node 2) and saved in the buffer of the backup node into the transaction log file, in a disk of the node 1, of the node 2, and the backup node (the node 3) may write the transaction log that is of the current node (the node 2) and saved in the buffer of the backup node into the transaction log file, in a disk of the node 3, of the node 2.

Step S212: Restore, based on the transaction log file that is in the disk and corresponds to the current node, lost data of the current node when a data loss event occurs in the current node.

As described above, when a breakdown occurs in the cluster database system having a Shared-Nothing architecture and causes a data loss of a node, a transaction log file of the node may be acquired from a disk configured for the node and a disk configured for a backup node saving a transaction log of the node, so as to restore data of the node. Specific implementation may include: reading a transaction log file that is in a current node disk and used for restoring data of a current node; reading a transaction log file that is in a backup node disk and used for restoring the data of the current node; selecting, from the read transaction log files, a transaction log file having most complete information; and restoring the lost data of the current node by using the transaction log file having the most complete information. Reference may be made to the cluster database system, which has a Shared-Nothing architecture, shown in FIG. 11, and according to content described in the foregoing embodiment, when the node 2 is used as the current node, the transaction log file of the current node that can be used to restore the data of the current node exists in the disk of the node 1, the disk of the current node (the node 2), and the disk of the node 3 shown in the figure; and if a system breakdown event causes a data loss of the current node, transaction log files of the current node that exist in the disk of the node 1, the disk of the current node (the node 2), and the disk of the node 3 may be used to restore the lost data of the current node. Because the three disks each have a transaction log of the current node, and it is possible that either of the three nodes cannot write the transaction log of the current node into a transaction log file of a configured disk in time in a process in which the breakdown event occurs, an optimal transaction log file of the current node needs to be selected to perform a data restoration operation of the current node. A selection method may be: A transaction log file having most complete information is selected from read transaction log files, that is, recording locations of the transaction log files are compared and a transaction log file, having a latest recording location, of the current node is selected, where an execution subject of comparing the transaction log files may be the current node, the backup node reads, from the backup node disk, a transaction log file of the current node and sends the transaction log file to the current node, and after receiving the transaction log file of the current node that is sent by each backup node, the current node compares the transaction log file of the current node that is sent by each backup node and a transaction log file of the current node that is read from the current node disk, so as to finally find the transaction log file having the most complete information. For example, by comparing the transaction log files of the current node that exist in the disk of the node 1, the disk of the current node (the node 2), and the disk of the node 3, it is obtained by comparison that the transaction log file, which is saved in the disk of the node 1, of the current node is the transaction log file having the most complete information, and then in this step, the transaction log file, which is saved in the disk of the node 1, of the current node is used to restore the data of the current node.

It can be known from the foregoing method that after a transaction of a current node is submitted, a generated transaction log is not only saved in a buffer of the current node, but also is backed up to a buffer of another node, which can reduce a probability of a transaction log loss caused by a data crash event of a node, and improve safety of a transaction log. The current node and all backup nodes that save the transaction log of the current node all can write the transaction log, which is saved in buffers of the current node and all the backup nodes, of the current node into a transaction log file, in disks configured for the node and all the backup nodes, of the current node, so that a recording location of the transaction log file, in each configured disk, of the current node is always kept as a recording location of a log generated in a last transaction operation of the current node. If a breakdown occurs in a database system, after the system is started and restored, lost data of the current node can be restored by using a transaction log file, which exists in each configured disk, of the current node.

This method is applied to a cluster database system in a high-speed interconnection network, and in the cluster database system, a node mentioned in the embodiment of this solution may be an interconnection device having data transmission and sharing functions, such as a node switch (Infiniband, a high-speed interconnection device) or a router.

The foregoing embodiment can better support a cluster database system having a Shared-Nothing architecture. Because in this method, a safety factor and multiple buffers, for saving a transaction log, of backup nodes are set for a node in a cluster, durability of a transaction log is improved. Both a current node and a backup node can write a transaction log, which is saved in buffers of the current node and the backup node, of the current node into transaction log files, in disks configured for the node and the backup node, of the current node, which ensures that the system can acquire a transaction log file having most complete information and perform data restoration work for the node, and can improve reliability of the transaction log file. This embodiment of the present invention keeps concurrent processing performance of an asynchronous submission solution in the prior art, and at the same time has durability of a synchronous submission solution; therefore, a risk of system data is reduced, and safety and reliability of the system data are improved.

In the foregoing embodiments, implementation methods are described mainly by using the cluster database systems having a Shared-Disk architecture and a Shared-Nothing architecture as an example. The foregoing solutions are also applicable to an online distributed data processing system or cluster that is implemented by using a WAL technology, such as a distributed storage system, a distributed KEY/VALUE database system, a distributed columnar database, a distributed diagram database or a database backup system. The embodiments described in detail in the solutions shall not be construed as a limitation to implementation manners of the solutions.

Figure 3:
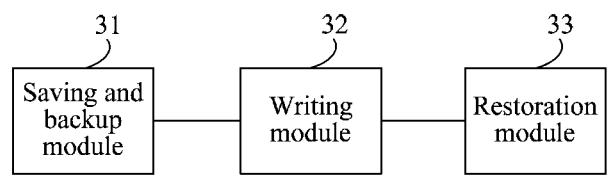
FIG. 3 is a schematic composition diagram of a structure of a data restoration system according to a third embodiment of the present invention.

An embodiment of the present invention provides a data restoration system, which is used to implement the foregoing method. FIG. 3 is a schematic composition diagram of a structure of a data restoration system according to a third embodiment of the present invention. The data restoration system in this embodiment of the present invention may be a cluster database system in which nodes in the system share disk data, and may be used to implement the solution shown in FIG. 1. As shown in the figure, the system in this embodiment of the present invention may at least include: a saving and backup module 31, a writing module 32, and a restoration module 33, where the saving and backup module 31 is configured to: after a transaction is submitted, save a generated transaction log to a buffer of a current node, and back up the transaction log to a buffer of at least one backup node except the current node, where the transaction log saved in the buffer of the current node is written into a transaction log file that is in a disk and used to restore data of the current node, so that a recording location of the transaction log file in the disk is kept the same as a recording location of the transaction log; and the generated transaction log is saved to the buffer of the current node, and the transaction log is backed up to a buffer of another node, which can improve safety of the transaction log of the current node;

the writing module 32 is configured to write the transaction log saved in the buffer of the current node or the transaction log backed up in the buffer of the backup node into a transaction log file in a disk, where the transaction log file in the disk is used for restoring data of the current node, and a trigger condition of the operation of writing, by the writing module 32, the transaction log saved in the buffer of the current node or the backup node into the transaction log file in the disk may be trigger, which may include trigger performed when a buffer storing the transaction log is full, and may further include trigger performed at a time interval starting from specified time; and the restoration module 33 is configured to restore, based on the transaction log file in the disk, lost data of the current node when a data loss event occurs in the current node.

Figure 4:
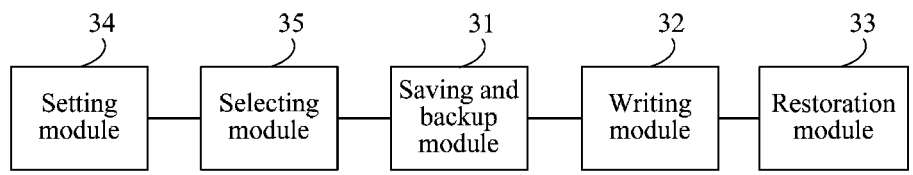
FIG. 4 is a schematic composition diagram of a structure of another data restoration system according to the third embodiment of the present invention.

Further optionally, reference may be made to a schematic diagram of a system shown in FIG. 4, and in this embodiment of the present invention, a setting module 34 and a selecting module 35 in the system may further be used to select a backup node and use a buffer of the selected backup node as a buffer for backing up the transaction log.

The setting module 34 is configured to set a safety level of the current node and a backup node quantity corresponding to the safety level. It may be considered that a higher safety level, which is set by the setting module 34, of a node indicates a greater quantity of backup nodes needed by the node, a WAL safety factor (WSF, WAL Safety Factor) is greater than or equal to 1, and when WSF>1, at least one node should be specified in advance in a cluster database system as a backup node.

The selecting module 35 is configured to select, for the current node from a node except the current node, a node of the backup node quantity corresponding to the safety level as a backup node, and use a buffer of the selected backup node as a buffer for backing up the transaction log.

Further optionally, a principle for selecting a backup node by the selecting module 35 may be a proximity principle, that is, a backup node of the quantity corresponding to the safety level is selected from a node adjacent to the current node. The selecting module 35 may also perform selection according to a rule, for example, select a backup node of the quantity corresponding to the safety level from a node, except the current node, including a vacant buffer. It can be seen from FIG. 10 that in a cluster database system, which has a Shared-disk architecture, shown in FIG. 10, each node includes multiple buffers that can be used to save a transaction log; and when it is set that a safety level WSF of a transaction log that is generated by a node 2 after a transaction is submitted is set to 3, two backup nodes except the node 2 which is used as the current node should exist in the system, and a node 1 and a node 3 that are adjacent to the current node may be selected as backup nodes.

Further optionally, after the selecting module 35 selects the backup node, the buffer of the selected backup node is used as a buffer for saving the transaction log of the current node. Specifically, an address of the buffer may be registered; and after the registration succeeds, registration information is sent to the backup node corresponding to the buffer, so that the transaction log of the current node is accurately written into the buffer. In the foregoing example, a vacant buffer may be selected from the node 1 in the system shown in FIG. 10, an address of the buffer is recorded and is registered as a buffer for saving the transaction log of the current node, after the registration succeeds, registration information may be sent to the node 1, and the node 1 writes, according to the registration information sent by the current node, the transaction log of the current node into the buffer corresponding to the registration information; and a vacant buffer is selected from the node 3 in the system shown in FIG. 10, an address of the buffer is recorded and is registered as a buffer for saving the transaction log of the current node, after the registration succeeds, registration information may be sent to the node 3, and the node 3 writes, according to the registration information sent by the current node, the transaction log of the current node into the buffer corresponding to the registration information.

Figure 5:
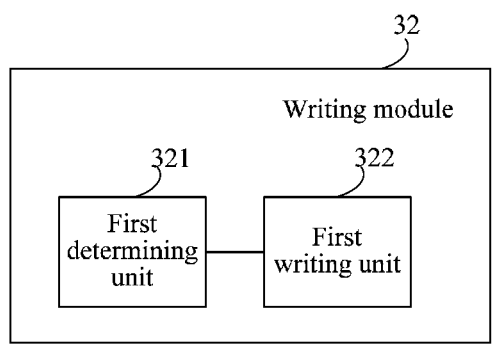
FIG. 5 is a schematic composition diagram of a structure of still another data restoration system according to the third embodiment of the present invention.

Further optionally, reference may be made to a schematic diagram of a writing module 32 shown in FIG. 5, and the writing module 32 may implement a writing operation for the transaction log file, in the disk, of the current node by using a first determining unit 321 and a first writing unit 322.

The first determining unit 321 is configured to: determine whether the transaction log file in the disk includes the transaction log saved in the buffer of the current node; if it is determined that the transaction log file in the disk does not include the transaction log saved in the buffer of the current node, generate a first writing message and send the first writing message to the first writing unit 322; and if it is determined that the transaction log file in the disk includes the transaction log saved in the buffer of the current node, generate a first writing skipping message and send the first writing skipping message to the first writing unit 322. When a writing operation of the current node is triggered, the first determining unit 321 first determines whether the transaction log file, in the disk, of the current node includes the transaction log saved in the buffer of the current node, that is, whether a location of the transaction log file, in the disk, of the current node is the same as a location of the transaction log in the buffer of the current node; and when the location of the transaction log file, in the disk, of the current node is the same as the location of the transaction log in the buffer of the current node, it indicates that the transaction log file, in the disk, of the current node includes the transaction log saved in the buffer of the current node, and the first writing unit 322 does not need to perform the writing operation again. When the first determining unit 321 determines that the transaction log file, in the disk, of the current node does not include the transaction log saved in the buffer of the current node, the first determining unit 321 may notify the first writing unit 322 to perform the writing operation; and when the first determining unit 321 determines that the transaction log file, in the disk, of the current node includes the transaction log saved in the buffer of the current node, the first determining unit 321 notifies the first writing unit 322 to skip performing the writing operation.

The first writing unit 322 is configured to: after receiving the first writing message, write the transaction log saved in the buffer of the current node into the transaction log file in the disk; and after receiving the first writing skipping message, skip writing the transaction log saved in the buffer of the current node into the transaction log file in the disk.

Figure 6:
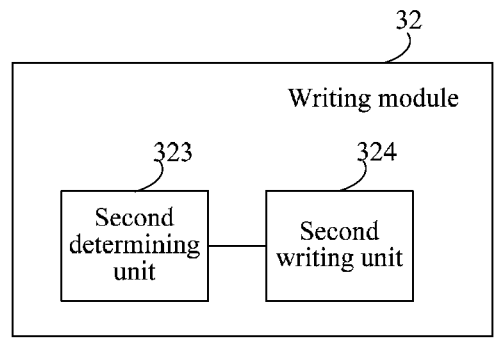
FIG. 6 is a schematic composition diagram of a structure of yet another data restoration system according to the third embodiment of the present invention.

Further optionally, reference may be made to a schematic diagram of a writing module 32 shown in FIG. 6, and the writing module 32 may further implement a writing operation for the transaction log file, in the disk, of the current node by using a second determining unit 323 and a second writing unit 324.

The first determining unit 323 is configured to: determine whether the transaction log file in the disk includes the transaction log backed up in the buffer of the backup node; if it is determined that the transaction log file in the disk does not include the transaction log backed up in the buffer of the backup node, generate a second writing message and send the second writing message to the second writing unit 324; and if it is determined that the transaction log file in the disk includes the transaction log backed up in the buffer of the backup node, generate a second writing skipping message and send the second writing skipping message to the second writing unit 324. When a writing operation of the backup node is triggered, the first determining unit 323 first determines whether the transaction log file in the disk includes the transaction log backed up in the buffer of the backup node, that is, whether a location of the transaction log file in the disk is the same as a location of the transaction log in the buffer of the backup node; and when the location of the transaction log file in the disk is the same as the location of the transaction log saved in the buffer of the backup node, it indicates that the transaction log file in the disk includes the transaction log backed up in the buffer of the backup node, and the second writing unit 324 does not need to perform the writing operation again. When the second determining unit 323 determines that the transaction log file in the disk does not include the transaction log backed up in the buffer of the backup node, the second determining unit 323 may notify the second writing unit 324 to perform the writing operation; and when the second determining unit 323 determines that the transaction log file, in the disk, of the current node includes the transaction log backed up in the buffer of the backup node, the second determining unit 323 notifies the second writing unit 324 to skip performing the writing operation.

The second writing unit 324 is configured to: after receiving the second writing message, write the transaction log backed up in the buffer of the backup node into the transaction log file in the disk; and after receiving the second writing skipping message, skip writing the transaction log backed up in the buffer of the backup node into the transaction log file in the disk.

In the system in this embodiment of the present invention, after a transaction of a current node is submitted, a generated transaction log is not only saved in a buffer of the current node, but also is backed up to a buffer of another node, which can reduce a probability of a transaction log loss caused by a data crash event of a node, and improve safety of a transaction log. The current node and all backup nodes that save the transaction log of the current node all can perform an operation of writing the transaction log, which is saved in buffers of the current node and all the backup nodes, of the current node into a transaction log file in a disk, so that a recording location of the transaction log file in the disk is always kept as a recording location of a log generated in a last transaction operation of the current node. If a breakdown occurs in the system in this embodiment of the present invention, after the system is started and restored, the current node in the system can read, from the disk, a transaction log file corresponding to the current node, and restore lost data of the current node.

The system in this embodiment of the present invention may be a cluster database system in a high-speed interconnection network, and in the system, a node mentioned in the embodiment of this solution may be an interconnection device having data transmission and sharing functions, such as a node switch (Infiniband, a high-speed interconnection device) or a router.

The system in this embodiment of the present invention may be a cluster database system having a Shared-Disk architecture, where a safety factor and multiple buffers, for saving a transaction log, of backup nodes are set for a node in a cluster; therefore, in this embodiment of the present invention, durability of a transaction log is improved. In the system provided in this embodiment of the present invention, both a current node and a backup node can write a transaction log, which is saved in buffers of the current node and the backup node, of the current node into a transaction log file that is in a disk and corresponds to the current node, which can improve reliability of the transaction log file. In terms of data processing, the system in this embodiment of the present invention keeps concurrent processing performance of an asynchronous submission solution in the prior art, and at the same time has durability of a synchronous submission solution; therefore, a risk of system data is reduced, and safety and reliability of the system data are improved.

Figure 7:
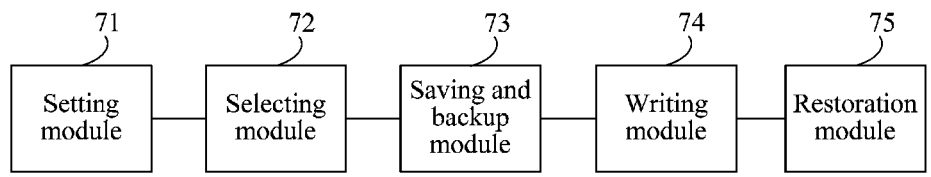
FIG. 7 is a schematic composition diagram of a structure of a data restoration system according to a fourth embodiment of the present invention.

An embodiment of the present invention provides a data restoration system, which is used to implement the foregoing method. FIG. 7 is a schematic composition diagram of a structure of a data restoration system according to a fourth embodiment of the present invention. The data restoration system in this embodiment of the present invention may be a cluster database system in which nodes in the system do not share disk data, and may be used to implement the solution shown in FIG. 2. As shown in the figure, the system in this embodiment of the present invention may at least include: a setting module 71, a selecting module 72, a saving and backup module 73, a writing module 74, and a restoration module 75.

The setting module 71 is configured to set a safety level of a current node and a backup node quantity corresponding to the safety level. The setting module 71 sets a safety level for a transaction log generated by the current node and a backup node quantity corresponding to the safety level. It may be considered that a higher safety level, which is set by the setting module 71, of a node indicates a greater quantity of backup nodes needed by the node, a WAL safety factor (WSF, WAL Safety Factor) is greater than or equal to 1, and when WSF>1, at least one node should be specified in advance in a cluster database system as a backup node.

The selecting module 72 is configured to select, for the current node from a node except the current node, a node of the backup node quantity corresponding to the safety level as a backup node, and use a buffer of the selected backup node as a buffer for backing up the transaction log.

Further optionally, a principle for selecting a backup node by the selecting module 72 may be a proximity principle, that is, a backup node of the quantity corresponding to the safety level is selected from a node adjacent to the current node. The selection may also be performed according to a rule, for example, a backup node of the quantity corresponding to the safety level is selected from a node, except the current node, including a vacant buffer. It can be seen from FIG. 11 that in a cluster database system, which has a Shared-Nothing architecture, shown in FIG. 11, each node includes multiple buffers that can be used to save a transaction log; and when it is set that a safety level WSF of a transaction log that is generated by a node 2 after a transaction is submitted is set to 3, two backup nodes except the node 2 which is used as the current node should exist in the system, and a node 1 and a node 3 that are adjacent to the current node may be selected as backup nodes.

Further optionally, after the selecting module 72 selects the backup node, the buffer of the backup node is used as a buffer for saving the transaction log of the current node. Specifically, an address of the buffer may be registered; and after the registration succeeds, registration information is sent to the backup node corresponding to the buffer, so that the transaction log of the current node is accurately written into the buffer. In the foregoing example, a vacant buffer may be selected from the node 1 in the system shown in FIG. 11, an address of the buffer is recorded and is registered as a buffer for saving the transaction log of the current node, after the registration succeeds, registration information may be sent to the node 1, and the node 1 writes, according to the registration information sent by the current node, the transaction log of the current node into the buffer corresponding to the registration information; and a vacant buffer is selected from the node 3 in the system shown in FIG. 11, an address of the buffer is recorded and is registered as a buffer for saving the transaction log of the current node, after the registration succeeds, registration information may be sent to the node 3, and the node 3 writes, according to the registration information sent by the current node, the transaction log of the current node into the buffer corresponding to the registration information.

The saving and backup module 73 is configured to: after a transaction is submitted, save a generated transaction log to a buffer of the current node, and back up the transaction log to a buffer of at least one backup node except the current node, where the transaction log saved in the buffer of the current node is written into a transaction log file that is in a disk and used to restore data of the current node, so that a recording location of the transaction log file in the disk is kept the same as a recording location of the transaction log; and the generated transaction log is saved to the buffer of the current node, and the transaction log is backed up to a buffer of another node, which can improve safety of the transaction log of the current node.

The writing module 74 is configured to write the transaction log saved in the buffer of the current node or the transaction log backed up in the buffer of the backup node into a transaction log file in a disk, where the transaction log file in the disk is used for restoring data of the current node, and a trigger condition of the operation of writing, by the writing module 74, the transaction log saved in the buffer of the current node or the backup node into the transaction log file in the disk may be periodical trigger, which may include trigger performed when a buffer storing the transaction log is full, and may further include trigger performed at a time interval starting from specified time.

The restoration module 75 is configured to restore, based on the transaction log file in the disk, lost data of the current node when a data loss event occurs in the current node.

Figure 8:
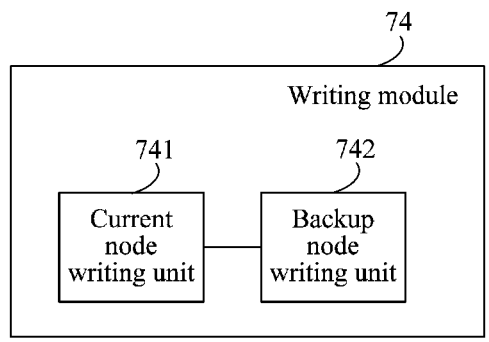
FIG. 8 is a schematic composition diagram of a structure of another data restoration system according to the fourth embodiment of the present invention.

Further optionally, reference may be made to a schematic diagram of a writing module 74 shown in FIG. 8, and the writing module 74 may implement, by using a current node writing unit 741 and a backup node writing unit 742, writing operations, of a current node and a backup node, for a transaction log file that is of the current node and in disks configured for the current node and the backup node, where the disks mentioned in this embodiment of the present invention include a current node disk supporting only access by the current node and a backup node disk supporting only access by the backup node. In the cluster database system, which has a Shared-Nothing architecture, shown in FIG. 11, a corresponding disk is configured for each node, and disk data is not shared between nodes. Therefore, when a transaction log of a current node and a transaction log of another node are saved in a buffer of the current node, a disk configured for the node includes a transaction log file of the node, and further includes a transaction log file that is of the another node and saved in the buffer of the node when the node is used as a backup node; and writing operations are performed for the transaction log files by the node according to the transaction logs saved in the buffer of the node.

The current node writing unit 741 is configured to write the transaction log saved in the buffer of the current node into a transaction log file in the current node disk, where the transaction log file in the current node disk is used for restoring the data of the current node. When a writing operation of the current node is triggered, the current node writing unit 741 writes the transaction log saved in the buffer of the current node into a transaction log file in a disk configured for the current node (that is, a current node disk), where the current node disk mentioned herein is a disk or a disk array that does not support access by a node except the current node. Because the transaction log file, in the current node disk, of the current node cannot be read by another node, in a case in which a data loss does not occur in the current node, the current node writing unit 741 does not need to detect a location of the transaction log file, and may directly perform the writing operation.

The backup node writing unit 742 is configured to write the transaction log backed up in the buffer of the backup node into a transaction log file in the backup node disk, where the transaction log file in the backup node disk is used for restoring the data of the current node. When a writing operation of the backup node is triggered, the backup node writing unit 742 writes the transaction log saved in the buffer of the backup node into a transaction log file in a disk configured for the backup node (that is, a backup node disk), where the backup node disk mentioned herein is a disk or a disk array that does not support access by a node except the backup node. Because the transaction log file, in the backup node disk, of the current node cannot be read by another node (can neither be read by the current node), in a case in which a data loss does not occur in the backup node, the backup node writing unit 742 does not need to detect a location of the transaction log file, and the backup node may directly perform the writing operation.

Figure 9:
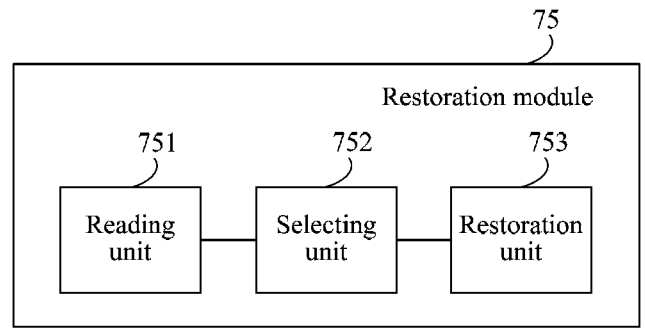
FIG. 9 is a schematic composition diagram of a structure of still another data restoration system according to the fourth embodiment of the present invention.

Further optionally, reference may be made to a schematic diagram of a restoration module 75 shown in FIG. 9, and the restoration module 75 may implement, by using a reading unit 751, a selecting unit 752, and a restoration unit 753, an operation of restoring the data of the current node.

The reading unit 751 is configured to read the transaction log file in the current node disk and further configured to read the transaction log file in the backup node disk.

The selecting unit 752 is configured to select, from the read transaction log files, a transaction log file having most complete information. The selecting unit 752 may perform selection by using a method of selecting the transaction log file having the most complete information from the read transaction log files, that is, comparing recording locations of the transaction log files and selecting a transaction log file, having a latest recording location, of the current node.

The restoration unit 753 is configured to restore the lost data of the current node by using the transaction log file that has the most complete information and selected by the selecting unit 753.

In the system in this embodiment of the present invention, after a transaction of a current node is submitted, a generated transaction log is not only saved in a buffer of the current node, but also is backed up to a buffer of another node, which can reduce a probability of a transaction log loss caused by a data crash event of a node, and improve safety of a transaction log. The current node and all backup nodes that save the transaction log of the current node all can write the transaction log, which is saved in buffers of the current node and all the backup nodes, of the current node into a transaction log file, in disks configured for the current node and all the backup nodes, of the current node, so that a recording location of the transaction log file, in each configured disk, of the current node is always kept as a recording location of a log generated in a last transaction operation of the current node. If a breakdown occurs in the system in this embodiment of the present invention, after the system is started and restored, the current node in the system can read, from the disk, a transaction log file corresponding to the current node, and restore lost data of the current node.

The system in this embodiment of the present invention may be a cluster database system in a high-speed interconnection network, and in the system, a node mentioned in the embodiment of this solution may be an interconnection device having data transmission and sharing functions, such as a node switch (Infiniband, a high-speed interconnection device) or a router.

The system in this embodiment of the present invention may be a cluster database system having a Shared-Nothing architecture, the system sets, for a node in the system, a safety factor and multiple buffers, for saving a transaction log, of backup nodes; therefore, in this embodiment of the present invention, durability of a transaction log is improved. In the system provided in this embodiment of the present invention, both a current node and a backup node can write a transaction log, which is saved in buffers of the current node and the backup node, of the current node into transaction log files, in disks configured for the current node and the backup node, of the current node, which ensures that the system can acquire a transaction log file having most complete information and perform data restoration work for the node, and can improve reliability of the transaction log file. In terms of data processing, the system in this embodiment of the present invention keeps concurrent processing performance of an asynchronous submission solution in the prior art, and at the same time has durability of a synchronous submission solution; therefore, a risk of system data is reduced, and safety and reliability of the system data are improved.

In the foregoing embodiments, implementation solutions are described mainly by using the cluster database systems having a Shared-Disk architecture and a Shared-Nothing architecture as an example. The foregoing solutions are also applicable to an online distributed data processing system or cluster that is implemented by using a WAL technology, such as a distributed storage system, a distributed KEY/VALUE database system, a distributed columnar database, a distributed diagram database or a database backup system. The embodiments described in detail in the solutions shall not be construed as a limitation to implementation manners of the solutions.

Figure 12:
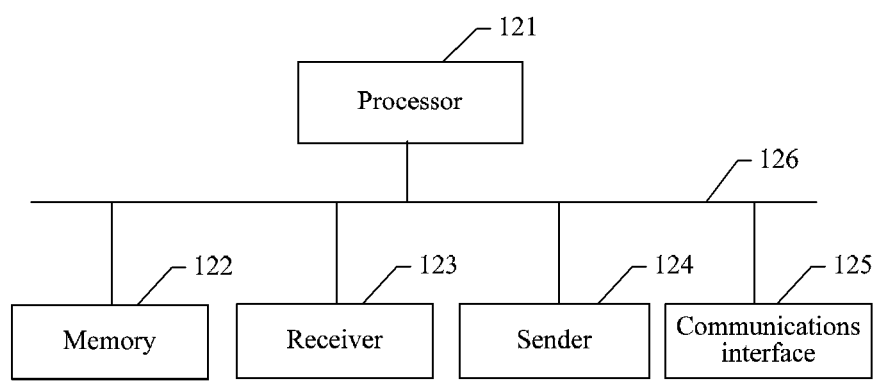
FIG. 12 is a schematic composition diagram of a structure of a node switch according to a fifth embodiment of the present invention.

FIG. 12 is a schematic composition diagram of a structure of a node switch according to an embodiment of the present invention. The method shown in FIG. 1 may be implemented by using the node switch, and the node switch in this embodiment may include: a processor 121, a memory 122, a receiver 123, and a sender 124.

The processor 121 is configured to: after a transaction is submitted, save a generated transaction log to a buffer of a current node, and back up the transaction log to a buffer of at least one backup node except the current node; is further configured to write the transaction log saved in the buffer of the current node or the transaction log backed up in the buffer of the backup node into a transaction log file in a disk; and is further configured to restore, based on the transaction log file in the disk, lost data of the current node when a data loss event occurs in the current node.

The sender 124 is connected to the processor 121 and is configured to send the generated transaction log to a buffer of at least one backup node except the current node, so as to perform backup.

The memory 122 is configured to store a buffer file in a processing process of the processor 121.

Further optionally, a mobile terminal in this embodiment of the present invention may further include a communications interface 125, configured to perform communication with an external device. The mobile terminal in this embodiment may include a bus 126. The processor 121, the memory 122, the receiver 123, and the sender 124 may be connected and perform communication through the bus. The processor 121 may be a central processing unit (central processing unit, CPU), an application-specific integrated circuit (application-specific integrated circuit, ASIC) or the like. The memory 122 may include entities having a storage function, such as a random access memory (random access memory, RAM) and a read-only memory (read-only memory, ROM).

Figure 13:
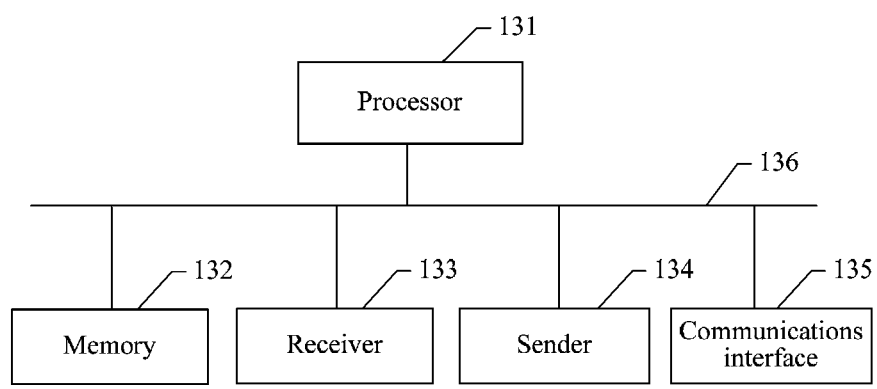
FIG. 13 is a schematic composition diagram of a structure of a node switch according to a sixth embodiment of the present invention.

FIG. 13 is a schematic composition diagram of a structure of a node switch according to an embodiment of the present invention. The method shown in FIG. 2 may be implemented by the using node switch, and the node switch in this embodiment may include: a processor 131, a memory 132, a receiver 133, a sender 134, and a communications interface 135.

The processor 131 is configured to: after a transaction is submitted, save a generated transaction log to a buffer of a current node, and back up the transaction log to a buffer of at least one backup node except the current node; is further configured to write the transaction log saved in the buffer of the current node or the transaction log backed up in the buffer of the backup node into a transaction log file in a disk; and is further configured to restore, based on the transaction log file in the disk, lost data of the current node when a data loss event occurs in the current node.

The receiver 133 is connected to the processor 131 and is configured to receive, from another node switch, a transaction log file that is of the current node and in a disk configured for the another node switch.

The sender 134 is connected to the processor 131 and is configured to send the generated transaction log to a buffer of at least one backup node except the current node, so as to perform backup.

The memory 132 is configured to store a buffer file in a processing process of the processor 131.

Further optionally, a mobile terminal in this embodiment of the present invention may further include the communication interfaces 135, configured to perform communication with an external device. The mobile terminal in this embodiment may include a bus 136. The processor 131, the memory 132, the receiver 133, and the sender 134 may be connected and perform communication through the bus. The processor 131 may be a central processing unit (central processing unit, CPU), an application-specific integrated circuit (application-specific integrated circuit, ASIC) or the like. The memory 132 may include entities having a storage function, such as a random access memory (random access memory, RAM) and a read-only memory (read-only memory, ROM).

According to the descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and a disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What are disclosed above are merely exemplary embodiments of the present invention, and certainly are not intended to limit the protection scope of the present invention. Therefore, equivalent variations made according to the claims of the present invention shall fall within the scope of the present invention.

What is claimed is:

1. A data restoration method, the method comprising:
after a transaction is submitted, saving a generated transaction log to a buffer of a current node;
registering, at the current node, an address of a buffer of one or more backup nodes, the one or more backup nodes being different than the current node;
backing up the transaction log to the buffer of the registered address of the one or more backup nodes;
writing the transaction log backed up in the buffer of the one or more backup nodes into a transaction log file in a disk, wherein the transaction log file in the disk is used for restoring data of the current node; and
restoring, based on the transaction log file in the disk, lost data of the current node when a data loss event occurs in the current node.

2. The method according to claim 1, wherein before saving the generated transaction log to a buffer of the current node the method further comprises:
setting a safety level of the current node and a backup node quantity corresponding to the safety level;
selecting, for the current node from one or more nodes different than the current node, one or more nodes as one or more backup nodes, wherein a quantity of the one or more selected nodes is the backup node quantity corresponding to the safety level; and
using a buffer of the selected backup node as a buffer for backing up the transaction log.

3. The method according to claim 2, wherein selecting, for the current node from one or more nodes different than the current node, one or more backup nodes comprises:

selecting the one or more backup nodes from one or more nodes different than the current node and adjacent to the current node, wherein a quantity of the selected one or more backup nodes is equal to the backup node quantity corresponding to the safety level;
or selecting the one or more backup nodes from one or more nodes different than the current node and comprising a vacant buffer, wherein a quantity of the selected one or more backup nodes is equal to the backup node quantity corresponding to the safety level.

4. The method according to claim 1, further comprising:
determining, by the current node, whether the transaction log file in the disk includes the transaction log saved in the buffer of the current node;
when it is determined that the transaction log file in the disk does not include the transaction log saved in the buffer of the current node, writing, by the current node, the transaction log saved in the buffer of the current node into the transaction log file in the disk.

5. The method according to claim 1, wherein writing the transaction log backed up in the buffer of the one or more backup nodes into a transaction log file in a disk comprises:
determining, by the one or more backup nodes, whether the transaction log file in the disk comprises the transaction log backed up in the buffer of the one or more backup nodes;
when it is determined that the transaction log file in the disk does not include the transaction log backed up in the buffer of the at least one backup node, writing, by the one or more backup nodes, the transaction log backed up in the buffer of the one or more backup nodes into the transaction log file in the disk.

6. The method according to claim 1, wherein the disk comprises a current node disk only supporting access by the current node, and a backup node disk only supporting access by the one or more backup nodes;
writing, by the current node, the transaction log saved in the buffer of the current node into a transaction log file in the current node disk, wherein the transaction log file in the current node disk is used for restoring the data of the current node; and
wherein writing the transaction log backed up in the buffer of the one or more backup nodes into a transaction log file in a disk comprises:
writing, by the backup node, the transaction log backed up in the buffer of the one or more backup nodes into a transaction log file in the backup node disk, wherein the transaction log file in the backup node disk is used for restoring the data of the current node.

7. The method according to claim 6, wherein restoring, based on the transaction log file in the disk, lost data of the current node when a data loss event occurs in the current node comprises:
reading the transaction log file in the current node disk;
reading the transaction log file in the backup node disk;
selecting, from the read transaction log files, a transaction log file having most complete information; and
restoring the lost data of the current node by using the transaction log file having the most complete information.

8. A data restoration system, comprising:
a computing hardware; and
a non-transitory computer-readable storage medium including computer-executable instructions executed by the computing hardware to perform, on the data restoration system, the method comprising:

after a transaction is submitted, saving a generated transaction log to a buffer of a current node;

registering, at the current node, an address of a buffer of one or more backup nodes, the one or more backup nodes being different than the current node;

backing up the transaction log to the buffer of the registered address of the one or more backup nodes;

writing the transaction log backed up in the buffer for backing up the transaction log into a transaction log file in a disk, wherein the transaction log file in the disk is used for restoring data of the current node; and restoring, when a data loss event occurs in the current node, lost data of the current node based on the transaction log file in the disk.

9. The system according to claim 8, further comprising instructions for:

setting a safety level of the current node and a backup node quantity corresponding to the safety level; and selecting, for the current node from one or more nodes different than the current node, one or more nodes as the one or more backup nodes, wherein a quantity of the one or more selected nodes is equal to the backup node quantity corresponding to the safety level, and using a buffer of the one or more backup nodes as the buffer for backing up the transaction log.

10. The system according to claim 9, further comprising instructions for selecting the one or more backup nodes from one or more nodes different than the current node and adjacent to the current node, wherein a quantity of the selected one or more backup nodes is equal to the backup node quantity corresponding to the safety level; or selecting the one or more backup nodes from one or more nodes different than the current node and including a vacant buffer, wherein a quantity of the selected one or more backup nodes is equal to the backup node quantity corresponding to the safety level.

11. The system according to claim 8, further comprising instructions for:

determining whether the transaction log file in the disk includes the transaction log saved in the buffer of the current node;

when it is determined that the transaction log file in the disk does not include the transaction log saved in the buffer of the current node, generating a first writing message and sending the first writing message to a first writing unit, wherein the first writing unit, after receiving the first writing message, is configured to write the transaction log saved in the buffer of the current node into the transaction log file in the disk.

12. The system according to claim 8, further comprising instructions for:

determining whether the transaction log file in the disk includes the transaction log backed up in the buffer of the one or more backup nodes;

when it is determined that the transaction log file in the disk does not include the transaction log backed up in the buffer of the one or more backup nodes, generating a second writing message and sending the second writing message to a second writing unit, wherein the second writing unit, after receiving the second writing message, write the transaction log backed up in the buffer of the one or more backup nodes into the transaction log file in the disk.

13. The system according to claim 8, wherein the disk comprises a current node disk only supporting access by the current node, and a backup node disk only supporting access by the one or more backup nodes, further comprising instructions for:

writing the transaction log saved in the buffer of the current node into a transaction log file in the current node disk, wherein the transaction log file in the current node disk is used for restoring the data of the current node; and writing the transaction log backed up in the buffer of the one or more backup nodes into a transaction log file in the backup node disk, wherein the transaction log file in the backup node disk is used for restoring the data of the current node.

14. The system according to claim 13, further comprising instructions for:

reading the transaction log file in the current node disk and reading the transaction log file in the backup node disk;

selecting from the transaction log files read by the reading module, a transaction log file having most complete information; and restoring the lost data of the current node by using the transaction log file having the most complete information.

* * * * *